Figure 1:
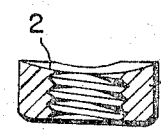

April 25, 1967          H. RIEKE          3,316,338

METHOD FOR MANUFACTURING A SCREW LOCKING DEVICE

Filed May 27, 1963          2 Sheets-Sheet 1

INVENTOR.
HELMUT RIEKE

BY Kelman and Berman

AGENTS

April 25, 1967  H. RIEKE  3,316,338
METHOD FOR MANUFACTURING A SCREW LOCKING DEVICE
Filed May 27, 1963  2 Sheets-Sheet 2

INVENTOR.
HELMUT RIEKE
BY Kelman and Berman
AGENTS

# United States Patent Office 3,316,338
Patented Apr. 25, 1967

3,316,338
METHOD FOR MANUFACTURING A SCREW LOCKING DEVICE
Helmut Rieke, Hauptstrasse 1715, Senne, Germany
Filed May 27, 1963, Ser. No. 283,624
Claims priority, application Germany May 25, 1962, R 32,791
3 Claims. (Cl. 264—267)

The invention relates to a method for manufacturing a screw locking device.

Lock washers and rings of plastic material for use with screws and nuts, self-locking nuts, as well as securing means of various kinds which are provided with a partly enclosed ring element at the nuts or screwpressure side, are already known in the art for a long time.

The plastic materials used in most cases for the securing elements are expensive and are of the thermoplastic variety which is difficult to mold by injection. Furthermore there must be taken into consideration a considerable waste during the injection molding because of the material required for pouring. The waste in the case of small rings or washers is usually greater than the useful parts. For this reason the costs of plastic rings made by the injection molding process are very high.

The object of the invention is to overcome the above disadvantages.

To this end the invention is characterized by a uniform pulverized formation applied on the ring surface of a nut with or without a bolt, or on the inner side of the bolt head, by dipping or the like in a finely pulverized plastic material which is finally heated by heat rays and is thereby applied without pressure in such a manner that there results, in the cold state a plastic locking deformable element which is permanently secured to the nut or the head of the bolt.

A further possible method resides in applying to the surface of the bolt's head, which is formed as a pressure surface extending diagonally and inwardly or is concave, a pre-formed ring of fine pulverized material.

Other objects and a fuller understanding of the invention may be had by referring to the following description and claims taken in conjunction with the accompanying drawing.

It should be understood, however, that these are given by way of illustration and not of limitation, and that various changes in the details, form and arrangement of the parts may be made without departing from the scope of the invention.

Figure 2:
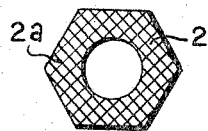
Figure 3:
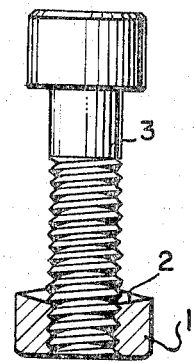
Figure 4:
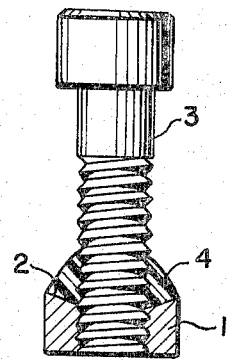
Figure 5:
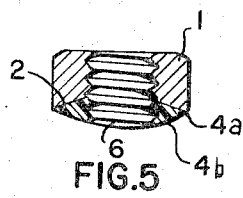
Figure 6:
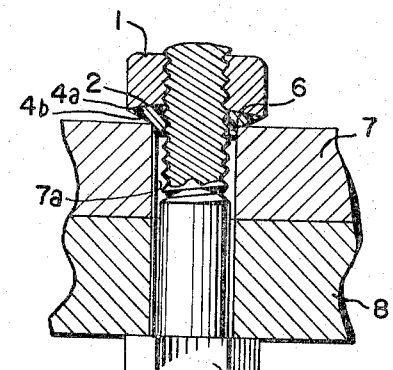
Figure 7:
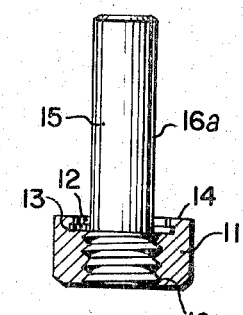
Figure 8:
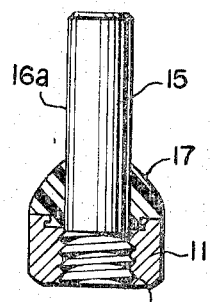
Figure 9:
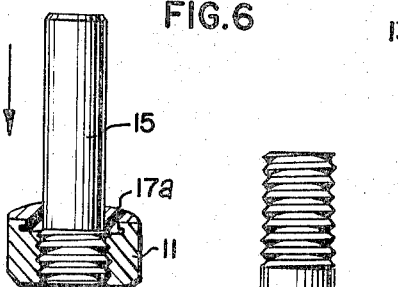
Figure 10:
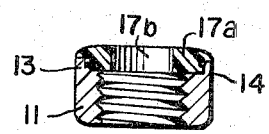
Figure 11:
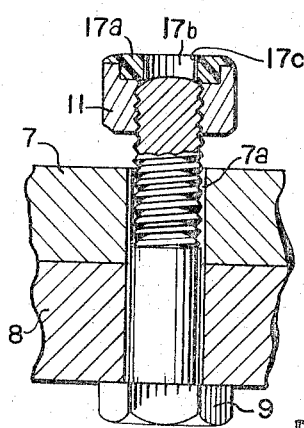
Figure 12:
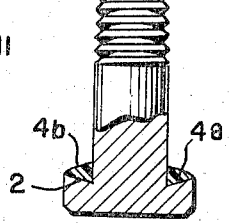
Figure 13:
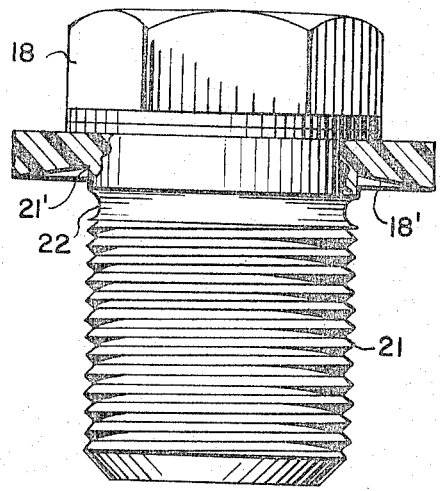
Figure 14:
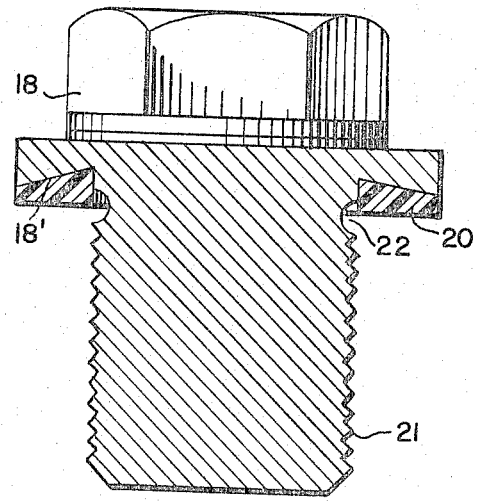
Figure 15:
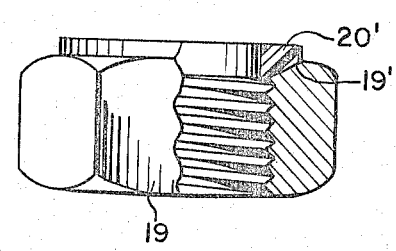

In the drawing:

FIG. 1 is a cross-section of a nut for use in the method according to the invention, FIG. 2 is a plan view of the nut according to FIG. 1, FIG. 3 is an elevational view of a bolt and of the nut of FIG. 1, partly in section, without plastic powder, FIG. 4 is a view similar to that of FIG. 3, but with plastic powder, FIG. 5 illustrates the nut after the melting step, FIG. 6 is a cross-section of the bolt and nut, FIGS. 7–10 illustrates further modifications of the lockwashed in cross-section, FIG. 11 illustrates the nut according to FIGS. 7–10 with a locking element fused on the upper side, in cross-section, FIG. 12 is a view, partly in section, of a threaded bolt provided with a fused on locking element, FIG. 13 is a view, partly in section of a bolt head with an application surface and a nut, FIG. 14 is a head bolt according to FIG. 1, with a plastic ring applied according to FIG. 1, and FIG. 15 shows, partly in section, a nut with a plastic ring applied thereupon.

Referring now to the figures in detail, the nut indicated by the reference numeral 1 in FIGS. 1 to 6 has an annular concave surface 2.

The pressure surface of the nut which extends radially relative to the axis of the threads may have a light grooving or knurling 2a. After the nut 1 has been roughened on its pressure surface 2, a bolt 3 or the like is screwed into the nut, as shown in FIG. 3.

The nut 2, provided with the bolt 3, is next dipped in fine plastic powder or like particles with its pressure surface upward, and is withdrawn from the plastic particles while the thread axis is maintained in an upright position and the pressure surface faces upwardly. A uniform powder accumulation 4 is produced by the dipping, and this accumulation is supported by the pressure surface 2 as shown in FIG. 4. The whole is now placed on a heating plate (not shown) and is heated to the melting point of the plastic powder 4 which is thereby fused into a unitary body and is firmly bonded to the pressure surface after cooling and solidification.

Due to the heat absorption of the nut 1 and the bolt 3, the powder accumulation 4 next begins to melt at the outer edges of the nut 1, the liquefaction of the powder accumulation 4 proceeds forward uniformly from these outer edges and from the nut pressure surface 2. The low viscosity melt is thus united inwardly with the roughened nut pressure face 2 and the thread of the bolt 3. The entire liquefaction process is completed within a few seconds.

The desired spherical outer contour 4b of the securing elements 4a is determined by the quantity of the fused powder 4.

The fused securing element 4a solidifies and during its cooling remains fluid the longest at the nut pressure surface 2, so that a completely non-porous and uniform heat shrinking of the securing elements 4a on the nut 1 is assured. The removal of the bolt 3 from the nut 1 follows in the cold state. A thread 6 is found on the inner face of the element 4a.

According to FIG. 6, the nut 1 is next screwed on a bolt 9 without a wrench until it makes contact with one of two parts 7, 8 which are to be joined by the bolt and nut. The spherical surface 4b touches with a small surface the bore 7a of part 7. As nut 1 is tighened the spherical surface 4b is pressed against the particular surface of the workpiece. The tightening of the nut 1 produces a strong compression of the fused on securing element, whereby the latter extends partly into the passage bore 7a of the part 7. The thread 6 of the securing element 4a is thereby pressed strongly against the thread of bolt 9.

The nut 11 according to FIGS. 7 to 11 is provided with a recess 12, in which is pierced an annular groove 13. The radial nut surface 14 is knurled, for a better adherence of the securing element 17a. A bolt 15 with a threaded portion 16 is employed as described with reference to bolt 3 in FIGS. 1 to 6. The smooth bolt shank 16a corresponds in diameter to the particular core diameter of the thread 16. The nut 11 with the screwed on bolt 15 is dipped in plastic powder 17. After this powder 17 is applied, the fusing process is carried out in the already described manner. After cooling, the core bolt 15 is unscrewed in the direction of the arrow. The cooled securing element 17a forms a unit with the nut 11.

The nut body 11 according to FIG. 11 is next screwed by hand on a bolt 9 up to the securing element 17a. The smooth bore 17b of the securing element 17a has approximately the core diameter of the particular thread of the bolt 9. With a further tightening of the nut 11, the thread of the bolt 9 cuts into the securing element 17a, so that instead of machining a plastic shaping of the securing element takes place.

After a complete tightening of the nut 11 there is formed, at the upper edge of the securing element 17a, a bead 17c. The securing element 17a fused with the nut 11 exercises a forceful pressure on the thread of the bolt 9, whereby a good friction lock and thereby a greater securing effect is produced. The securing element 17a encloses the thread of the bolt down to its base, so that a penetration of moisture from without is not possible.

FIGS. 12 shows a bolt 10 whose head has on its underside an annular pressure surface 2 to which a securing element 4a having a spherical outer contour 4b is bonded. The element 4a may be formed as the corresponding element on the nut 1 shown in FIGS. 1 to 6.

A hexagon head bolt 18 is shown in FIGS. 13 and 14. The annular bearing surface 18' on the head of the bolt 18' is concave.

A circular groove 22 is provided on the threaded portion 21 of the bolt 18 at a slight distance from the inner edge 21' of the surface 18'. A nut 19, shown in FIG. 15, is provided with an annular recessed bearing surface 19' similar to that of the bolt 18. Rings 20, 20' consisting of finely pulverized plastic material are preformed or sintered in tablet shape by means of appropriate machines or apparatus.

The self-supporting plastic rings 20, 20' are conformingly applied to the respective faces 18' 19' of the bolt 18 and nut 19, and are fused to the faces. The concave surfaces of the bolt 18 and the nut 19 prevent the plastic ring from being displaced outwardly during the tightening of the bolt 18 or nut 19.

The advantage of the invention resides in a barely visible film of plastic which covers the thread passages of the nut during the fusing step. This film is exceptionally friction-proof and reduces the wear of the nut or bolt during a forceful tightening. There is no limit to the amount of tightening, due to the securing element, since the outward flow of plastic material through the inner joint of a securing element with the nut body is impossible. The great securing and good tightening effect is influenced by the completely elastic force and friction lock provided in the form of a tablet-shaped ring securing element applied between the workpiece surface and the bolt thread and fused on the bolt thread and the nut body. The remarkable advantage of the invention will be apparent, since the bolt securing means is additionally capable of frequent re-use, without decreasing the securing or tightening effect.

The invention having thus been described what is claimed and desired to be protected by Letters Patent of the United States is:

1. A method of forming a securing element on a member having an axis, a thread about said axis, and a face radially extending about said axis, which comprises:
   (a) immersing said member in a body of fine particles of fusible plastic;
   (b) withdrawing said member from said body while maintaining said axis in an upright position and directing said face upwardly, whereby particles of said plastic are carried on said face from said body;
   (c) heating said particles on said face until they are fused into a unitary body; and
   (d) bonding said unitary body to said face.

2. A method of forming a securing element on the underside of a screw head which comprises:
   (a) immersing a screw having a head and an annular radially extending face on the underside of said head in a body of fine particles of a fusible plastic;
   (b) withdrawing said screw from said particles while maintaining the thread axis thereof in an upright position, the annular surface on the underside of said head facing upward, whereby particles of said plastic are carried on said face from said body;
   (c) heating said particles on said face until they are fused into a unitary body; and
   (d) cooling said unitary body until it is solidified.

3. A method of forming a securing element on an internally threaded nut member which comprises:
   (a) threadedly engaging said nut member with an externally threaded screw member so that said screw member axially projects from a face of said nut member radially extending about the axis of the engaged threads;
   (b) immersing said nut member while engaged with said screw member into a body of fine particles of fusible plastic;
   (c) withdrawing said nut member from said body while maintaining said axis in an upright position and directing said face in an upward direction, whereby particles of said plastic are carried on said face from said body;
   (d) heating said particles on said face after withdrawal from said body until the particles are fused into a unitary body;
   (e) permitting said unitary body of fused particles to cool until solidified; and
   (f) threadedly disengaging said screw member from said nut member and said unitary body.

References Cited by the Examiner

UNITED STATES PATENTS

| | | | |
|---|---|---|---|
| 2,052,616 | 9/1936 | Gardes | 264—274 |
| 2,091,504 | 8/1937 | Gray | 264—259 |
| 2,326,455 | 8/1943 | Gray | 85—1 |
| 2,392,173 | 1/1946 | Mercier | 156—91 |
| 2,409,759 | 10/1946 | Hosking | 264—271 X |
| 2,761,349 | 9/1956 | Heller | 151—7 |
| 2,904,845 | 9/1959 | Sperry | 264—242 |
| 2,968,840 | 1/1961 | Morse | 264—265 |
| 2,981,051 | 4/1961 | Arnold | 85—1 |
| 2,983,534 | 5/1961 | Heller | 151—7 |
| 3,040,796 | 6/1962 | Gouverneur | 151—7 |
| 3,061,888 | 11/1962 | Wadham | 264—279 X |

OTHER REFERENCES

Scott L. L., Hervey L. R.: Pressed and Sintered Nylon Parts, in "Material and Methods," pp. 108–111, October 1962.

ROBERT F. WHITE, *Primary Examiner.*

EDWARD C. ALLEN, *Examiner.*

C. B. ELDERKIN, L. S. SQUIRES, T. J. CARVIS,
*Assistant Examiners.*